March 3, 1959 H. MOSS 2,876,381

MULTIPLE OUTPUT SWITCHING SYSTEM

Filed Feb. 11, 1955 3 Sheets-Sheet 1

INVENTOR.
HILARY MOSS

BY Charles F. Carroll, Jr.

ATTORNEY

March 3, 1959 H. MOSS 2,876,381

MULTIPLE OUTPUT SWITCHING SYSTEM

Filed Feb. 11, 1955 3 Sheets-Sheet 2

INVENTOR.
HILARY MOSS

BY
Charles F. Carroll, Jr.

ATTORNEY

MULTIPLE OUTPUT SWITCHING SYSTEM

Filed Feb. 11, 1955 3 Sheets-Sheet 3

INVENTOR.
HILARY MOSS

BY Charles F. Carroll, Jr.

ATTORNEY

United States Patent Office 2,876,381

Patented Mar. 3, 1959

2,876,381

MULTIPLE OUTPUT SWITCHING SYSTEM

Hilary Moss, Malvern, Pa., assignor to Burroughs Corporation, Detroit, Mich., a corporation of Michigan Application February 11, 1955, Serial No. 487,548

11 Claims. (Cl. 315—8.6)

This invention is concerned with improvement in electronic switching systems, and more particularly with improvements in such systems using magnetic beam switching tubes.

In electronic switching systems, a multiplicity of circuits are connected, disconnected, and reconnected in timed and or sequential patterns particular to the overall device in which they serve. As such devices grow in complexity, the number of circuits and the range of interconnections they require grow exceedingly rapidly. Rapid and precise switching among many positions, currently in the range from a few to several hundred positions, becomes a limitation upon the size, cost, and performance of a system. Circuits exist, utilizing conventional components to do such switching through a limited number of switching positions, but complexity grows out of proportion to the number of switching positions. Eccles-Jordan flip-flops, diode matrices, ring counters, blocking oscillators, and counter tubes are representative of this conventional circuitry. These components and the associated techniques have proven expensive and complicated in practice and require considerable apparatus which is bulky, uses much power, and is quite vulnerable to failure due to the many components used.

An object of this invention is to provide improved electronic switching systems.

A specific object of this invention is to provide a more rapid and reliable switching system, wherein the total number of positions is theoretically unlimited, yet the components and circuitry are compact and simple.

In accordance with a principal feature of this invention, a number of magnetron beam switching tubes such as described in "Electronic Design" of January, 1954, are connected in a sequential manner to provide an unlimited number of switching positions. As described therein, the switching grids shift the electron beam from one position to the next. In accordance with this feature of this invention, successive tubes are so interconnected as to provide a smooth, unbroken transition of these switching shifts from one tube to the next. In this manner an output signal may be produced at only one of the plurality of switching positions. Accordingly, a discrete output position exists for each switching step of the complete cycle.

In accordance with another feature of this invention, an electron beam is formed in the first of a succession of magnetron beam switching tubes by pulsing negatively the spade electrode of an array of electrodes designated as the initial array. This beam is shifted one position at a time by signals on the switching grids. The spade electrode of a predetermined array, usually the next-to-last array of each tube of the succession, is paralleled with the spade electrode of a selected array, usually the initial array of the succeeding tube, so the beam of the succeeding tube is formed when the next-to-last array of the tube preceding it receives its beam. The next switching signal disables or cuts off the first beam. This same signal shifts the beam in the second tube one position. A smooth transition of the switching from one tube to the next is thus achieved.

In order that the features and advantages of this invention may be more clearly understood and more easily carried into effect, specific embodiments will be more fully described in connection with the accompanying drawing, in which:

Fig. 1 is a perspective view of one embodiment of a magnetron beam switching tube which may be used in accordance with this invention;

Fig. 1*a* is a plan view of the tube shown in Fig. 1;

Figure 1A:
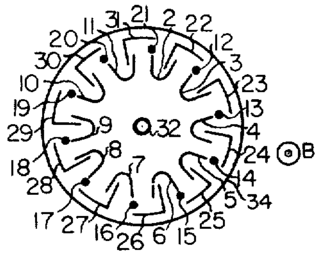
Figure 1:
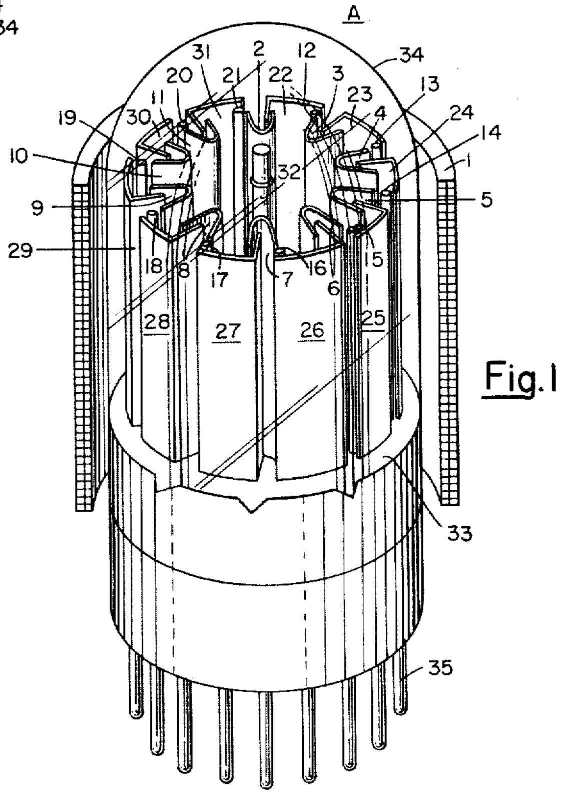

Referring now to the drawing, Fig. 1 shows one embodiment of a magnetron beam switching tube, A, which is useful in this invention. An axial magnetic field is produced by cylindrical magnet 1 surrounding tube A. Cathode 32 is positioned axially in tube A. Surrounding cathode 32 is a cylindrical arrangement of electrodes constituted of several different types of electrodes. Spade electrodes 2 to 11 are positioned with their longest dimension parallel to cathode 32, and in a concentric arrangement equidistant from cathode 32, with each spade's convex surface facing toward cathode 32. Switching grid electrodes 12 to 21 are positioned parallel to cathode 32, in a concentric arrangement of greater radius than the similar arrangement for spade electrodes 2 to 11. Separate target or output electrodes 22 to 31 are positioned with their length parallel to cathode 32 and in a concentric arrangement of greater radius than the arrangement for grid electrodes 12 to 21. An array of electrodes comprises a spade electrode, a switching grid electrode, and the target electrode positioned circumferentially to cover the gap between spade electrodes. This entire assembly of arrays and their electrodes is held in position by small lugs or similar projections inserted in spacers such as mica spacer 33. A similar spacer at the top of the assembly has been omitted from Fig. 1, to clearly show the electrode arrangement. Envelope 34 maintains an evacuated chamber within which this assembly can be energized and operated as an electron discharge device. Pins 35 are provided for electrical connections to the different electrodes within the tube which, for clarity, are not shown.

Utilizing the combined effects of the axial magnetic field produced by magnet 1, the electrical fields formed by potentials on electrodes of the tube, and a starting pulse on one electrode, an electron beam can be formed, which flows almost entirely to a target in a single array. This target may be any one of the targets 22 to 31, depending on which electrode receives a beam forming potential. For example, if all spade electrodes are positive relative to the cathode and adjusted to magnetron cut-off conditions $$V_{\text{cut-off}}=e/8m\cdot B^2r_s^2(1-r_c^2/r_s^2)^2$$

where:

$V$=spade electrode voltage
$e/m$=electron's charge/mass ratio
$B$=magnetic field in gauss
$r_c$=cathode radius
$r_s$=spade radius, from center of tube to spade, effective in above equation.

the tube is in a stable, cut-off condition. No beam is formed to any array. If, then, the potential of one spade electrode 2 were reduced to an adequately lower potential, an electron beam would be formed and fall on target or output electrode 22. For a beam to fall on target 22 as described, the magnetic flux from magnet 1 must flow from the end near pins 35 upwardly through tube A. When the beam does impinge on target 22, a small amount of the beam current will flow to spade electrode 2, for the beam grazes spade electrode 2 as it flows to target 22. By supplying suitable series spade resistors, the IR voltage drop caused by a small portion of the beam striking a spade will maintain the spade's potential low enough to hold the beam in a position grazing that spade and striking the adjacent output electrode target: in this instance, grazing spade 2 and striking target 22.

With the beam on target 22, if switching grid 12 is adequately reduced in potential the beam will advance across spade 3 to graze spade 3 and strike target 23. The resulting IR voltage drop reduces the potential of spade 3, to hold the beam on target 23. In like manner, successive switching signals can switch the beam from one target to the next to provide an output signal on each successive target.

Figure 2:
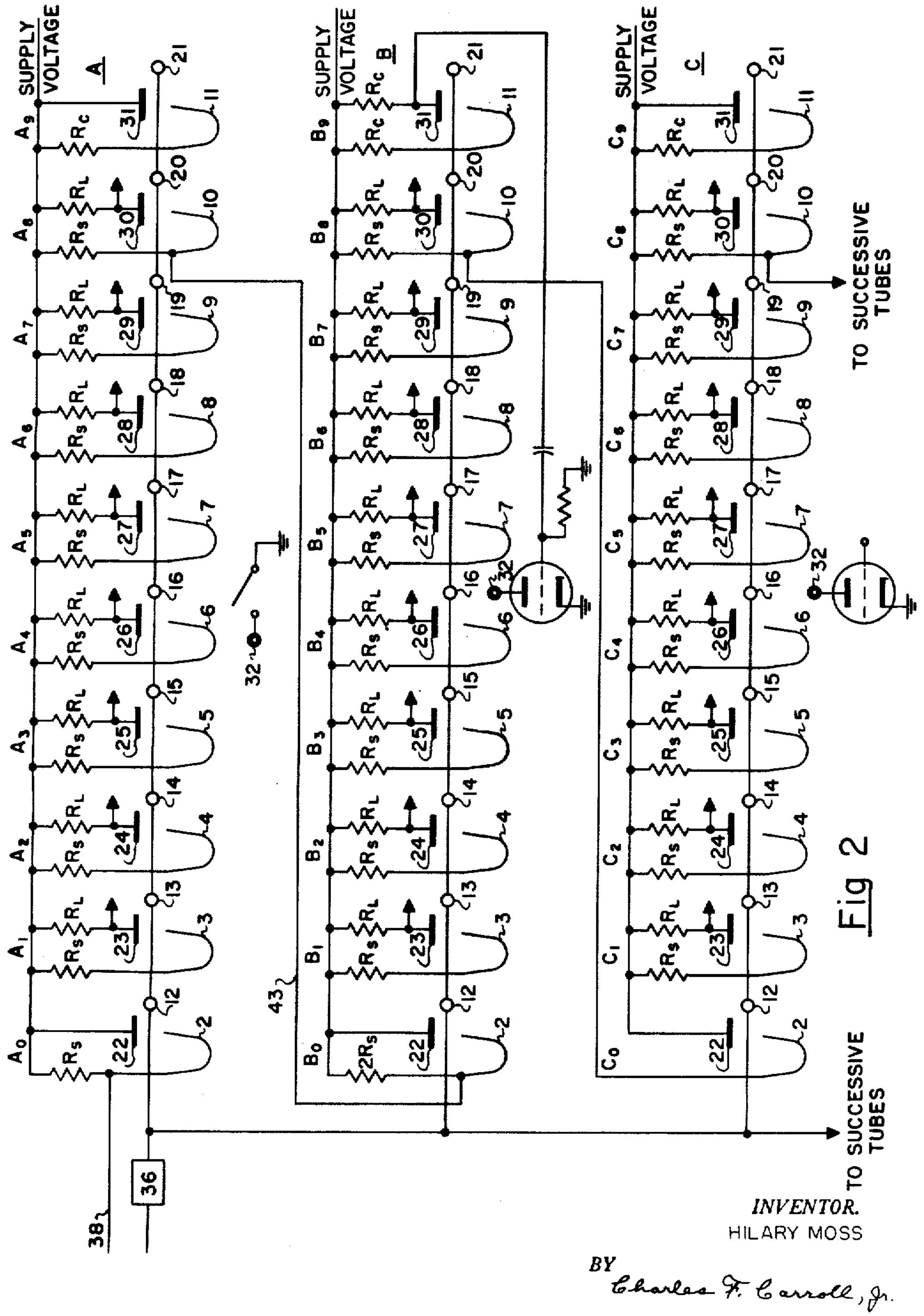
Fig. 2 is a schematic diagram of a multiposition electronic switching circuit of this invention, embodying beam switching tubes.

Fig. 2 is a diagrammatic view of a plurality of such magnetron beam switching tubes A, B, C, etc., and associated schematic circuitry of one embodiment of this invention. Each spade electrode 2—9 is connected to a voltage source through resistors $R_S$ of ohmic value suitable for producing the IR voltage drop required to hold the beam on an adjacent target 22—29, respectively. As a design center within a wide range of suitable values for supply voltage and ohmic resistance of $R_S$, a supply voltage of 100 volts and a resistance of 150 kilohms for $R_S$ have provided satisfactory operation. The targets and spades are shown for the different arrays, providing beam receiving compartments numerically designated $A_0$–$A_9$, etc. wherein the electrodes have the relationship as shown in Fig. 1*a*. Excepting first designated target 22 and last designated target 31 of each tube, each target has a load resistor $R_L$ connecting it to the voltage source. Output signals for each switching position are taken from targets 23—30 at the load resistor. Spade 10 of each tube is connected to spade 2 of the following tube. Operation of the system has been found satisfactory when either each of these spades has an individual load resistor twice the ohmic value of $R_S$, as shown for the connection between tubes A and B, or both spades are connected to a common resistor of ohmic value $R_S$, as shown for the connection between tubes B and C.

In one embodiment of this invention, spade 11 of each tube is connected to a voltage source either directly or through resistor $R_c$ which is too low in ohmic value to produce the required IR spade voltage drop which would maintain the beam so the last position $A_9$, $B_9$, $C_9$, etc., of each tube is unstable and switching to this position cuts off the beam. Target 31 is provided to assume that any beam in position $A_9$ etc. does not result in output current at other targets. In this embodiment, all switching grids 12—21 of all tubes are commonly connected to a pulsing circuit 36, which produces a switching pulse of sufficient amplitude and limited duration. If the switching pulse were not held to a short interval, the beam would switch more than one step.

When the system is in an extinguished state, means are necessary to cause formation of a beam at a particular position to start a switching ciycle. Thus, starting pulses are applied on terminal 38, lowering the potential of spade 2 until a beam is formed on target 22.

To examine an operating cycle as produced by the system, reference is made to Fig. 2. Assume, initially, that all tubes are cut off. To start the switching action, spade 2 of tube A is momentarily lowered to near cathode potential by a pulse at terminal 38, and a beam forms, and is held on target 22. Once the beam is formed, the first pulse from the switching circuit 36 applied to the switching grids 12—21 will switch the beam to target 23 of tube A. Subsequent pulses from switching circuit 36 move the beam to targets 24 to 29, in succession. Spade 10 of tube A is connected to spade 2 of tube B so that the beam is switched from target 29 to target 30 the portion of the beam collected by spade 10 will cause an IR voltage drop across the spade resistors $2R_s$ of both spades 10 of tube A and 2 of tube B and thus lower their potential. While this lowered potential holds the beam of tube A on target 30, it also forms the beam of tube B so it is held on target 22 of tube B. The ohmic range through which spade-to-supply resistance $R_S$ can hold a beam stably on an adjacent target is wide enough to allow switching while only one beam is formed and only spade 10 is drawing current, and also to hold two beams on targets 30 and 22 respectively after the second beam forms and spade 2 also draws current. For the spades 10 and 2 of successive tubes so interconnected, it has been found that satisfactory performance occurs when the effective resistance to supply for both spades is $R_S$. This value is provided either by the two individual resistors $2R_s$ in parallel as shown for tubes A and B, or is provided by single resistor $R_S$ as shown for similar interconnection between tubes B and C. Values for $R_S$ can vary from less than 50 kilohms to more than 400 kilohms for variations in the spade supply voltage from more than 150 volts to less than 50 volts.

A subsequent pulse from switching circuit 36 switches the beam of tube A from target 30 to target 31, grazing spade 11, and simultaneously switches the newly formed beam of tube B from target 23, grazing spade 3. Resistor $R_C$ for spade 11 is of low enough ohmic value that it is not within the stable self-holding range for $R_S$ so the beam cannot be held stably on target 31 by means of beam current, and consequently all spades are at about equal potential so that the beam of tube A is cut off.

In all tubes targets 23—30 are the switching positions connected to output utilization circuits. Successive pulses on the switching grids 12—21 switch the beam to these targets in succession, and from tube to tube. When the eighth position of tube B is reached, the transfer of switching from tube B to tube C is performed in the same way as the transfer from tube A to tube B.

It will be seen that there is no theoretical limit to the number of tubes which can be connected in this manner. If "*n*" tubes having ten compartments each are used, a total of "8*n*" positions are available in accordance with the embodiment shown. To make a closed loop system which is cyclically repetitive, spade 2 of tube A is connected to spade 10 of the last tube. Such a cyclically repetitive system can divide by any integer, with the number of positions in a cycle equal to the divisor. The dividend is represented by the total number of switching steps. The quotient is the number of cycles, and therefore, is available as an output pulse signal at any output target.

Figure 3:
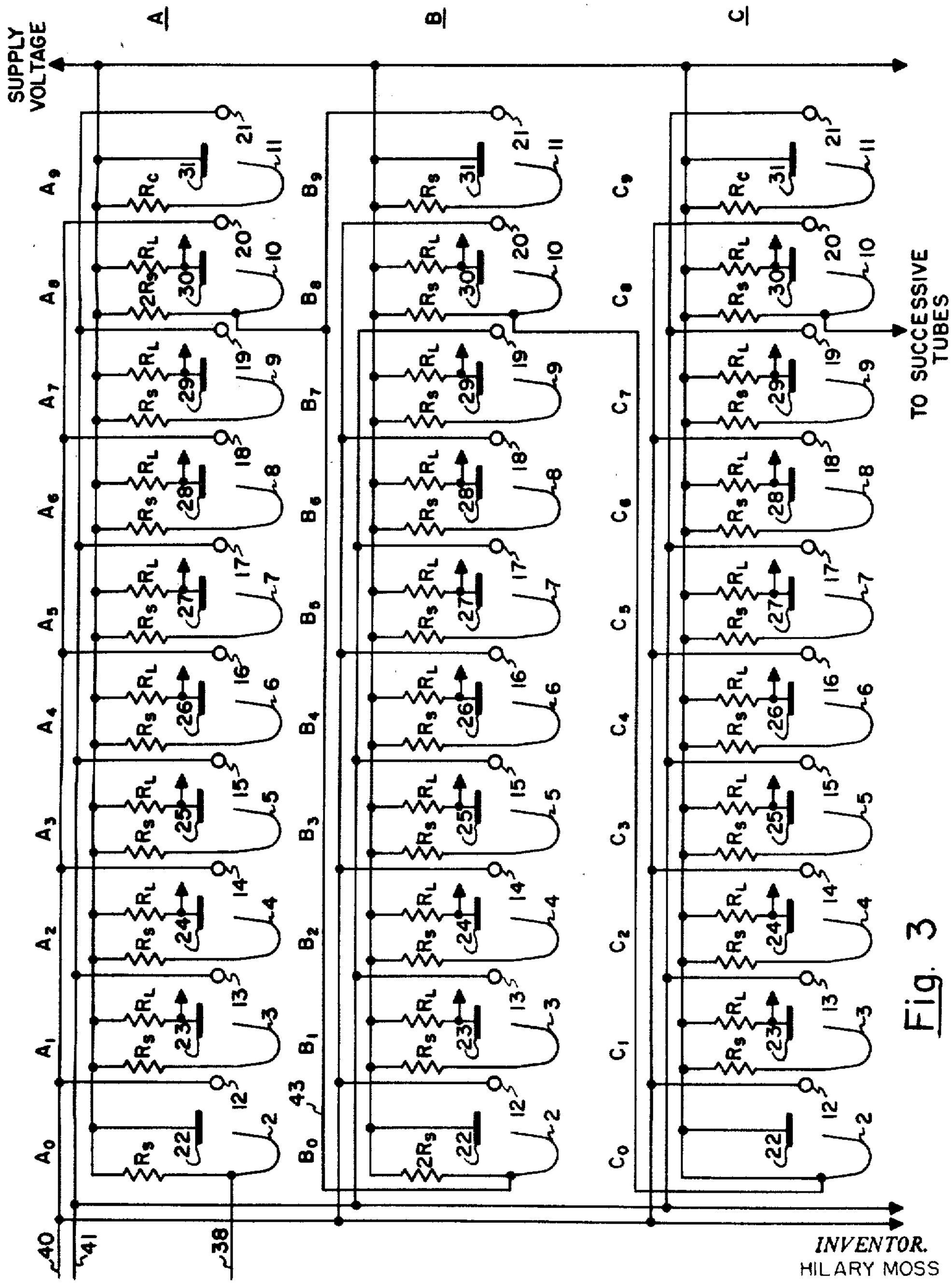
Fig. 3 is a schematic diagram of a further switching circuit embodiment of this invention.

Fig. 3 is a schematic diagram of such magnetron beam switching tubes A, B, C, etc., in another embodiment of this invention. Spade electrodes 2—11 and target electrodes 22—31 are connected as described for Fig. 2. Alternate switching grids of each tube are in common connections, i. e., switching grids for all even positions $A_0$, $A_2$, $A_4$, . . ., $B_0$, $B_2$, $B_4$, . . ., $C_0$, $C_2$, $C_4$, . . ., etc., are connected to lead 40 and switching grids for all odd positions $A_1$, $A_3$, $A_5$, . . ., $B_1$, $B_3$, $B_5$, . . ., $C_1$, $C_3$, $C_5$, . . ., etc., are connected to lead 41.

Starting pulses are applied on lead 38, momentarily lowering the potential of spade 2 of tube A until a beam is formed on target 22. The IR voltage drop from beam current flowing through resistor $R_S$ connecting spade 2 to the supply voltage will keep spade 2 at a reduced voltage and hold the beam on target 22.

To examine the action of this circuit embodiment, assume initially that all tubes are cut off, i. e., no beams are formed. A starting pulse is applied to spade 2, tube A, through lead 38, and a beam forms on target 22. No output signal is produced. A first switching signal is applied to lead 40, connected to switching grids 12, 14, 16, 18, and 20, and causes the beam to advance to target 23 to produce an output signal. The beam will not advance beyond target 23 with subsequent signals at terminal 40 until switching grid 13 receives a switching signal at lead 41. The next switching signal therefore, is applied to lead 41 connected to switching grids 13, 15, 17, 19, and 21, and causes the beam to advance only one position to target 24. This alternate application of switching signals to leads 40 and 41 can be derived from flip-flop circuits, center-tapped transformers, and other balanced inputs to leads 40 and 41, to affect this alternate pulsing of odd and even numbered switching grids, and the switching steps will progress as described.

When the eighth position $A_8$ is reached, the potential reduction occurring on spade 10 of tube A also appears on spade 2 of the following tube B due to interconnection 43. The transition from tube A to tube B is the same as described for the embodiment of Fig. 2, except that alternate switching pulses on odd and even switching grids are used. The transition from tube B to tube C could occur as described for Fig. 2, with the same exception as above for the switching grids. However, the switching sequence for any tube in the succession can be disabled by methods other than extinguishing the beam when it is switched to a particular position. As shown in Fig. 3, switching grid 21 of tube B can be connected to spade electrode 10 of tube A and a resistor $R_S$, of a value allowing spade 11 of tube B to hold a beam on target 31 when switched thereto, connects spade electrode 11 of tube B to a supply voltage.

When tube B is switched to its ninth position, the portion of the beam current intercepted by spade 11 causes an IR voltage drop in resistor $R_S$ suitable for holding the beam stably on target 31. Tube B will remain on this position until the next switching cycle, effectively disabled from following hte switching sequence. When, in the next switching cycle, the beam of tube A reaches spade 10 of tube A in the switching sequence, the voltage change on spade 10 is applied to switching grid 21 of tube B and causes the beam of tube B to move to the $B_0$ position. This method of disabling a tube from following the switching sequence avoids the need for forming the beam anew for each switching cycle.

The same advantages accrue to the embodiment described for Fig. 3 as to the embodiment of Fig. 2. In addition, the switching grid circuit is not dependent upon a critical length input pulse to hold the beam switching to a single step for each input signal. Further, the switching grids will respond to alternating voltage of a wide range of frequencies. If the frequency of this voltage is accurately controlled, the switching steps will be accurately placed in time relationship.

Figure 4:
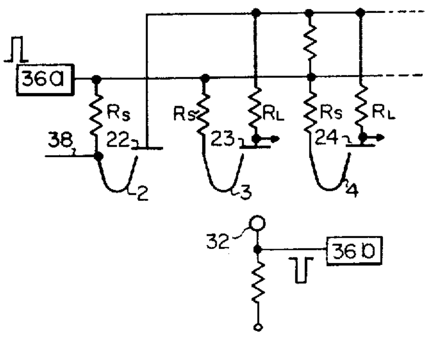
Fig. 4 is a schematic diagram of a further switching circuit embodiment of this invention.

The beam switching operation can be performed with beam switching tubes other than the embodiment shown in Figs. 1–3. For example, as shown in Fig. 4, switching may be accomplished by pulsing all spade electrodes with a positive voltage pulse of critical duration applied in the circuit between a common connection to all spade electrodes and a voltage supply, or by pulsing the cathode 32 with a negative voltage pulse of critical duration applied between the cathode and ground. In such embodiments switching grid electrodes are not used. Further, the switching sequence can progress around such a tube in either direction, depending upon the polarity of the magnetic field.

When the beam switching sequence is to be disabled by extinguishing the beam, it can be extinguished by methods other than by making the spade resistor for the position at which the beam is to be extinguished too low to hold the beam. As shown in Fig. 2, the circuit from circuit ground to cathode 32 can be interrupted and thereby extinguish the beam.

What is claimed is:

1. In an electronic switching system a succession of magnetron beam switching tubes, each tube having a plurality of electrode arrays for successively receiving the beam and each electrode array having a spade electrode, circuit means including resistive paths and conductive paths interconnecting the spade electrode of a predetermined array of each tube with the spade electrode of a selected array of the next tube and responsive to beam current to said predetermined array to lower the voltage of said spade electrodes and form a beam in said next tube, and current responsive means connected to an electrode of the array succeeding said predetermined array of each tube and responsive to beam current in said succeeding array to develop a voltage change and disable stepping of the beam when said beam reaches said succeeding array.

2. A circuit as defined in claim 1 wherein said current responsive means is in the beam current path of said succeeding array and responds to beam current to develop voltage changes which extinguish the beam when said beam reaches said succeeding array.

3. A circuit as defined in claim 1 wherein said current responsive means is connected for applying potential to the spade electrode of the array succeeding said predetermined array of each tube.

4. An electronic switching system comprising a succession of multiple output beam switching tubes, each tube having a plurality of switching positions including a first and last switching position and each position having specified tube anodes of varying type therein, starting means connected to a tube anode in the first position of the first tube of said succession and responsive to application of a negative going signal to form an electron beam directed to said first position, impedance means connected to an anode in each of said switching positions except the last position of all of said tubes for connection to a voltage source and responsive to beam current to produce a voltage drop across said impedance to enable said switching positions to hold the electron beam when switched thereto, means connected with the last position of each tube to disable switching of the electron beam when switched thereto, circuit means interconnecting an anode in one switching position of each tube with a corresponding type anode in the first switching position of the following tube and responsive to beam current to said one switching position to develop a voltage drop to form an electron beam in said following tube when the electron beam of the tube preceding said following tube is switched to the interconnected position, and an input circuit connected to another type anode in each of said switching positions in said succession of tubes and responsive to switching signals to apply said signals to said connected anodes to advance a beam current through said switching positions of said sucession of tubes.

5. An electronic switching system comprising a succession of magnetron beam switching tubes, each tube including a plurality of successive anode arrays for receiving the beam and each array having a spade electrode and a switching electrode, starting means connected to the spade electrode of the first array of said successive arrays of the first tube of said succession of tubes and responsive to a starting pulse to form an electron beam directed into said first array, impedance means connected to all spade electrodes except the last spade electrode of said tubes and to a voltage source and responsive to beam current to produce a voltage change to hold the electron beam of their respective tube on their respective array when the beam is switched thereto, current responsive means connected with the last array of each tube to cut off the electron beam thereof when said beam is switched thereto, circuit means interconnecting the spade electrode of a predetermined array of each tube with the spade electrode of a selected array of the following tube and responsive to beam current in said predetermined array to produce a voltage change and to form an electron beam in said following tube when the beam of the tube preceding said following tube is switched to said predetermined array thereof, and an input circuit connected to switching electrodes of said tubes and responsive to switching signals to apply said signals to said electrodes to cause a beam switching current to advance to successive arrays and to successive tubes in smooth transition.

6. An electronic switching system comprising a succession of magnetron beam switching tubes, each tube having a succession of anode arrays for receiving the beam and each array having a spade electrode and a switching electrode, circuit means coupling the spade electrode of a predetermined array of each tube with the spade electrode of the initial array of said succession of arrays of the succeeding tube and responsive to beam current to said predetermined array to lower the voltage of the spade electrode thereof to start said succeeding tube when the beam switching sequence reaches said predetermined array, and current responsive means interconnecting an electrode of said predetermined array of each tube with the switching electrode of the last array of said succession of arrays of the succeeding tube.

7. An electronic switching system comprising a succession of multiple output beam switching tubes, each tube having a succession of switching positions and each position having a spade electrode, circuit means interconnecting the spade electrode of a predetermined array of each tube with the spade electrode of a selected array of the next tube transmitting voltage changes to said spade electrode of a selected array to form a beam in said next tube, current controlling means connected to the spade electrodes of all of said switching positions except the last position of all said tubes and responsive to electrons from said spade electrodes to develop a voltage drop to hold the beam when switched thereto and connected to the spade electrode of the last position of each tube and responsive to electrons from said spade electrode to develop a different voltage to cut off the beam when switched thereto.

8. An electronic switching system comprising a succession of magnetron beam switching tubes, each tube including a cathode and a succession of anode arrays and each array having a spade electrode, a switching electrode and a target electrode, a conductive network having separate resistive branches connected to separate spade and target electrodes of said tubes and responsive to current to develop voltage changes, direct coupling means between the spade electrode of a predetermined array of each tube and the spade electrode of the initial array of said succession of arrays of the succeeding tube and responsive to beam current to said predetermined array to transfer a voltage change to start said succeeding tube, and circuit means connected to the last array of each tube and responsive to switching of the beam to said last array to inhibit further beam switching therein.

9. An electronic switching system comprising a succession of magnetron beam switching tubes, each tube including a cathode, a plurality of beam forming anodes, a plurality of switching anodes and a plurality of output anodes arranged in a succession of arrays of one of each type of electrode per array, circuit means coupling the penultimate array of said succession of arrays of each tube with the initial array of the succeeding tube to transmit a potential change to said initial array to start said succeeding tube when the beam switching sequence reaches said penultimate array, current conductive means connected to the last beam forming electrode of each tube and responsive to electron current to develop a potential on said last beam forming electrode of each tube to cut off each tube when the beam reaches said last array, and an input circuit connected to the switching electrodes of said plurality of tubes, said input circuit being adapted for applying signals to said switching electrodes to change the potentials thereon to cause a beam switching sequence in successive tubes.

10. In an electronic switching system, a succession of multiple output beam switching tubes each having a plurality of beam-receiving compartments and each compartment having a plurality of beam-receiving electrodes, circuit means including resistance branches interconnecting one beam-receiving electrode of one tube with a similar beam-receiving electrode of a following tube and responsive to beam current conduction to said one electrode of said one tube to reduce the potentials of said interconnected electrodes and to form a beam current in a specified beam-receiving compartment in said following tube, and circuit means coupled to each tube and responsive to beam current to disable stepping of the beam of each tube when it reaches a predetermined compartment.

11. In an electronic switching system, a succession of multiple output beam switching tubes each having a plurality of beam-receiving compartments with each compartment having a plurality of anodes, circuit means including impedance means connected to said anodes and a conductive path interconnecting one anode of one tube with a similar anode of a following tube and responsive to current flow to said one anode of said one tube to reduce the potential thereof and to cause beam current to be supplied to a specified beam receiving anode in the following tube of said succession of tubes, and circuit means coupled to each tube and responsive to beam current to extinguish the beam of each tube when it reaches a predetermined compartment.

References Cited in the file of this patent

UNITED STATES PATENTS

| | | |
|---|---|---|
| 2,473,159 | Lyman | June 14, 1949 |
| 2,528,100 | Williams | Oct. 31, 1950 |
| 2,568,177 | Vroom | Sept. 18, 1951 |
| 2,614,168 | Vroom | Oct. 14, 1952 |
| 2,679,978 | Kandiah | June 1, 1954 |
| 2,721,955 | Fan et al. | Oct. 25, 1955 |
| 2,758,790 | Brian | Aug. 14, 1956 |

OTHER REFERENCES

Hough et al.: "Some Recently Developed Cold Cathode Glow Discharge Tubes and Associated Circuits," Electronic Engineering, June 1952, pp. 272–276.

UNITED STATES PATENT OFFICE

CERTIFICATE OF CORRECTION

Patent No. 2,876,381 March 3, 1959

Hilary Moss

It is hereby certified that error appears in the printed specification of the above numbered patent requiring correction and that the said Letters Patent should read as corrected below.

Column 3, line 53, for "assume" read -- assure --; line 63, for "ciycle" read -- cycle --; column 4, line 1, after "so that" insert -- when --; column 5, line 36, for "hte" read -- the --.

Signed and sealed this 7th day of July 1959.

(SEAL)
Attest:

KARL H. AXLINE
Attesting Officer

ROBERT C. WATSON
Commissioner of Patents